United States Patent Office 2,844,548

Patented July 22, 1958

1

2,844,548

METHOD FOR THE INCORPORATION OF LIGNIN INTO SYNTHETIC RUBBER

Henry E. Haxo, Jr., Bloomfield, and George S. Mills, Clifton, N. J., assignors to United States Rubber Company, New York, N. Y., a corporation of New Jersey No Drawing. Application July 28, 1954
Serial No. 446,394

6 Claims. (Cl. 260—17.5)

This invention relates to the incorporation of lignin into synthetic rubber, and more particularly to mixed coagula from synthetic rubber latex and aqueous alkali solution of lignin.

Lignin is commonly recovered by precipitation from its soluble sodium salt in the black liquor in the kraft sulfate process of wood pulping by acidification of the waste liquor. Lignin is readily soluble in aqueous alkali, e. g. alkali metal hydroxide or ammonium hydroxide solution, to form alkali lignate solution. It has been known for some time that lignin is an excellent reinforcing agent for synthetic rubber provided that the lignin is added as an aqueous alkali solution to the synthetic rubber latex and the mixture co-precipitated. See Keilen and Pollak, Ind. Eng. Chem., 39, 480–483 (April 1947) and Pollak U. S. Patent 2,608,537. However, when effective reinforcing amounts of lignin are co-precipitated with the synthetic rubber, e. g. 25 to 75 parts of lignin per 100 parts of synthetic rubber, recovery of the co-precipitate is very difficult because it comes down in such a finely divided condition that it is impractical to filter it, as is done with the coagulum crumbs in straight synthetic rubber latex coagulation. See Keilen et al., India Rubber World, 124, 178–181 (May 1951). To date, lignin is still not being used as a reinforcing agent for synthetic rubber commercially.

The present invention provides a method of preparing readily filterable coagulum particles of a mix containing lignin and synthetic rubber in amounts from 25 to 75 parts of lignin per 100 parts of rubber from synthetic rubber latex and aqueous alkali solution of the lignin. The present invention also produces masterbatches showing superior processing and smoothness of milled compounds. The present method of preparing the co-precipitate of synthetic rubber and lignin in no way impairs the quality of vulcanizates made therefrom.

In carrying out the present invention, there is first co-precipitated with conventional acid, a mixture of an amount of synthetic rubber latex containing 25% to 75% of the synthetic rubber component of the fixed coagulum particles and an amount of aqueous alkali solution of lignin containing substantially all the lignin component of the final coagulum particles. The remaining 75% to 25% of the synthetic rubber in the form of synthetic rubber latex is then mixed with the first synthetic rubber-lignin co-precipitate and is coagulated on the co-precipitate particles by the residual or excess acid coagulant remaining in the first co-precipitate. The first co-precipitate is in the form of a sludge of very fine particles that cannot readily be separated from the aqueous medium by filtering. The last coagulation of the added synthetic rubber latex around the finely divided particles of the first synthetic rubber-lignin co-precipitate forms crumbs having a physical character somewhat like straight synthetic rubber crumb coagulum particles and which are of large enough dimensions to permit efficient filtration and drying similar to the coagulum crumbs in conventional synthetic rubber latex coagulation. The amount of lignin will be 25 to 75 parts per 100 parts of synthetic rubber in the final synthetic-rubber lignin mix. The initially mixed latex and lignin solution may be co-precipitated by mixing with an aqueous solution of acid, such as formic, sulfuric, hydrochloric, phosphoric or acetic acid, which may, if desired, contain added salts. The latex and lignin solution may be coagulated by the acid under any desired conditions of agitation. High speed agitation as with a propeller, or in a mixing turbine or in a centrifugal pump, is preferred since under conditions of maximum shear, one obtains optimum dispersion of lignin in the rubber particles in the first co-precipitate. It is preferred to coagulate the latex in the second coagulation under conditions of minimum shear, as in a slow speed agitator, e. g. using a paddle stirrer, in order to prevent breakdown of the large crumb particles that are formed into smaller less filterable particles.

The concentration of the alkali aqueous solution of lignin is not critical, the lignin concentration generally being 5% to 25%. The concentration of the synthetic rubber latex is not critical, the synthetic rubber concentration generally being 15% to 35%. The synthetic rubber latex is an alkaline emulsion polymerizate of conventional synthetic rubber forming monomers polymerized at temperatures in the range −40° F. to 150° F. with conventional emulsifiers, catalysts, activators, regulators, as well known in the art.

Where rubber processing oil is included in the synthetic rubber-lignin composition, the oil may be added at any stage of the present process, either as such or in aqueous emulsion. For example, the oil may be dispersed in the aqueous alkali solution of the lignin, or it may be separately dispersed and added to the lignin solution, or it may be emulsified in or added as an emulsion to the latex, or it may be added as such or as an emulsion to the first co-precipitate. We have found that any of these methods of incorporating the oil prior to the addition of the remaining synthetic rubber latex further improves the filterability of the final crumbs. Preferably, the oil, when used, is added as such directly to the first co-precipitate before the remaining synthetic rubber latex is added. If desired, however, the oil may be added after the second latex coagulation as such or as an emulsion. The amount of rubber processing oil when used is about 5 to 50 parts per 100 parts of rubber. Such processing oil, as is known, may be an aromatic, naphthenic, paraffinic, or asphaltic rubber softening oil. It may be distilled fractions or residue oils from the distillation of petroleum, or distilled oil fractions from the distillation of coal tar.

The polymerizable material in the preparation of the synthetic rubber latex may be one or a mixture of butadienes-1,3, for example, butadiene-1,3, methyl-2-butadiene-1,3 (isoprene), chloro-2-butadiene-1,3 (chloroprene), piperylene, 2,3-dimethyl butadiene-1,3. The polymerizable material, as is known, may be a mixture of one or more such butadienes with one or more polymerizable compounds which are capable of forming rubber copolymers with butadienes-1,3; for example, up to 70% of such mixture of one or more compounds which contain a single $CH_2=C<$ group where at least one of the disconnected valences is attached to an electro-negative group, that is, a group which substantially increases the electrical dissymmetry or polar character of the molecule. Examples of such monoolefines containing a terminal methylene ($CH_2=C<$) group which are copolymerizable with butadienes-1,3, are aryl olefines, such as styrene, vinyl naphthylene; alpha methyl styrene, parachloro styrene, dichloro styrene; the alpha methylene carboxylic acids and their esters, nitriles and amides, such as acrylic acid, methyl acrylate, methyl methacrylate, acrylonitrile, methacrylonitrile, methacrylamine; methyl vinyl ether, methyl vinyl ketone; vinylidene chloride. Such synthetic rubbers may generically be termed "butadienoid polymer synthetic rubbers."

The following examples illustrate the present invention. All parts and percentages referred to herein are by weight.

*Example I*

In this and the following examples, the GR–S synthetic rubber lattices used were prepared by conventional polymerization at about 41° F. to about 60% conversion of aqueous emulsions of 75 parts of butadiene and 25 parts of styrene containing potassium soap of disproportionated rosin acid emulsifier, organic peroxide catalyst, iron pyrophosphate activator, and mixed tertiary mercaptan regulator.

A sodium lignate solution was made by adding to a suspension of 120 g. of commercial lignin (Indulin A) in 500 cc. of water, an aqueous solution of 12 g. of sodium hydroxide in 24 cc. of water. This solution was blended with 762 g. of GR–S latex containing 150 g. of rubber. The lignin and rubber in this blend was co-precipitated by addition to an acidic solution of about 70 cc. of 90% formic acid in 6 liters of tap water at 50° C. with stirring with a propeller-type stirrer. One-half minute later, an additional 762 g. (150 g. dry weight) of GR–S latex was added with slow stirring to the co-precipitate slurry, whereby the added latex was coagulated by the residual acid from the first co-precipitation to form a mixed coagulum that on standing appeared as a coarse, sandy precipitate that filtered by suction through #54 filter paper as fast as it could be poured. The filter cake was re-suspended in 2½ gal. of water and refiltered, requiring 10 minutes to refilter at 50° C. The cake was dried three days in vacuo at 80° C. (masterbatch A).

As a control for comparison to the above procedure according to the present invention, a similar sodium lignate solution prepared from 120 g. of lignin and 12 g. of sodium hydroxide was blended with an amount of GR–S latex containing all 300 g. of rubber, and the blend was co-precipitated in a single step by addition to an aqueous solution of formic acid with stirring with a propeller-type stirrer. The co-precipitate was a fine slurry that did not readily settle. The filtration time with suction through #54 filter paper was 50 minutes at a slurry temperature of 54° C. The filter cake was resuspended in water and refiltered, requiring 13 minutes to refilter at 65° C. The cake was dried 3 days in vacuo at 80° C. (masterbatch B).

Masterbatches A and B were separately compounded on a 6" x 12" laboratory mill at 150° F. with 5 parts of zinc oxide, 5 parts of an asphaltic rubber processing oil (Paraflux), and 2 parts of stearic acid per 100 parts of rubber content, resulting in batch temperatures of 180° F.–210° F. Compounding was completed on a mill at room temperature by the addition of 1.5 parts of mercaptobenzothiazole, 0.25 part of copper diethyldithiocarbamate, and 2.5 parts of sulfur per 100 parts of rubber content.

During the mixing and compounding of the stocks, it was observed that the compound from masterbatch A made according to the present invention banded more smoothly and handled more easily on the mill than the compound from masterbatch B. Physical tests on cured samples showed no substantial variation in properties of vulcanizates made from the two masterbatches A and B when cured to equivalent per cents elongation.

*Example II*

A sodium lignate solution was prepared from 120 g. of lignin and 12 g. of sodium hydroxide, as in Example I. This solution was blended with 610 g. of GR–S latex containing 120 g. of rubber, and the lignin and rubber in the blend were co-precipitated with 2.5 liters of water at 50° C. containing 40 cc. of 90% formic acid under rapid stirring conditions. Stirring was maintained one minute after mixing with the formic acid solution and then 15 g. of Paraflux heated to 100° C. were added over the next half minute, with continued stirring.

The slurry was then transferred to a container equipped with a slow paddle-wheel type stirrer, and 915 g. of GR–S latex containing 180 g. of rubber were added over a period of 2 to 3 minutes, with 2 minutes additional slow stirring. The mixed coagulum was let stand 5 minutes before filtration through coarse cotton filter cloth. Filtration was by gravity and was extremely rapid, as a result of the coarse crumblike texture of the mixed coagulum. The addition of the rubber processing oil before the coagulation of the final latex improved the filterability. The filtered coagulum crumb was re-suspended in 10 liters of water as 40° C. and again filtered readily through coarse cotton filter cloth (masterbath C). The product was dried 3 days in vacuo at 80° C. On compounding and curing masterbatch C, similarly to masterbatches A and B of Example I, and testing samples, compounds from masterbatch C showed equivalent physical properties to the compounds from masterbatches A and B when cured to the same elongations.

*Example III*

A control one-step masterbatch D was prepared as follows:

144 g. of lignin (Indulin A) were suspended in 580 cc. water at 40° C. and dissolved by addition of 29 cc. of sodium hydroxide solution containing 14.4 g. of sodium hydroxide, followed by high speed stirring. With continued high-speed stirring, 60 g. of a highly aromatic rubber processing oil (Sundex 53) at 50° C. were added over about two minutes time. The suspension was then mixed with 1305 g. of GR–S latex containing 300 g. of rubber, and stirred 4 minutes. This mixture was then co-precipitated by adding it to 5 liters of water at 80° C. containing 48 cc. of 90% formic acid. This procedure occupied 4 minutes. The flocculate was a sandy precipitate which required 23 minutes to filter with suction through #54 filter paper. The cake was re-slurried with slow stirring in 10 liters of 75° C. water and required 5 minutes to refilter. The cake was dried 4 days in vacuo at 80° C.

A two-step masterbatch E was prepared according to the present invention as follows:

A sodium lignate solution was prepared as in masterbatch D above, containing 144 g. Indulin A and 14.4 g. of sodium hydroxide. This solution was blended with 652 g. of GR–S latex containing 150 g. of rubber. The blend was flocculated in 2.5 liters water at 80° C. containing 48 cc. of 90% formic acid, with high speed propeller-type stirring. After mixing about one-half minute, 60 g. of Sundex 53, at 50° C., were added, and all was stirred at a slightly slower rate for 3 minutes more. A paddle-wheel type stirrer was substituted for the propeller type stirrer and, while slowly stiring, 650 g. of GR–S latex containing 150 g. of rubber latex were slowly blended in. The crumb was formed, which filtered, using coarse cotton filter cloth, as fast as the suspension could be poured. The cake was re-suspended with slow stirring in 10 liters of water at 75° C. and filtered through cloth in 5 minutes time. This cake was dried 4 days in vacuo at 80° C.

Plasticity measurements were made on uncompounded masterbatches D and E on a parallel plate or compression type plastometer, described in India Rubber World, 128, 626 (1953). The readings were taken after 8 minutes compression at a sample temperature of 250° F. The plasticity readings were 67 for masterbatch D and 58 for masterbatch E, showing a significant increase in plasticity in masterbatch E over masterbatch D.

Plasticity or viscosity measurements were also made on uncompounded masterbatches D and E on a Mooney shearing disc plastometer or viscometer, described in Ind. Eng. Chem. (Anal. Ed.) 6, 147 (1934). The Mooney viscosity measurements were made with the large rotor supplied with the instrument after 4 minutes between the platens of the instrument at 212° F., a one minute warm-up period being used, such measurements being conventionally designated as "ML–4, 212° F." Mooney viscosities (A. S. T. M. Standards D927–52T), the lower the readings the lower the viscosity and hence the greater the plasticity. The Mooney (ML–4, 212° F.) viscosities for the uncompounded masterbatches D and E were 109 and 104, respectively, masterbatch E showing increased plasticity over masterbatch D.

163 parts by weight of each of the masterbatches D and E were mixed on a 150° F. 6" x 12" mill (stock temperature 180–210° F.) with 5 parts of zinc oxide and 2 parts of stearic acid. During this mixing it was observed that masterbatch E processed better than masterbatch D, and that mixing time for masterbatch E was 5 minutes compared with 8 minutes for masterbatch D. Both mixes were then compounded at room temperature on a laboratory 2-roll mill with 2 parts of mercaptobenzothiazole, 0.3 part of copper diethyl dithiocarbamate and 2.5 parts of sulfur. The Mooney (ML–4, 212° F.) viscosity readings were 110 on the compounded masterbatch D and 90 on the compounded masterbatch E.

Physical properties of the stocks from masterbatches D and E were then evaluated on samples press cured at 292° F. for various times. The following table is a companion of results on cures to equivalent 660% elongation:

| | From Masterbatch D | From Masterbatch E |
|---|---|---|
| Tensile, p. s. i. | 3,050 | 2,860 |
| Elongation, percent | 660 | 660 |
| Duro A Hardness | 66 | 62 |
| Modulus at 300% Elongation, p. s. i. | 840 | 690 |
| Tors. Hyst. at 280° F. | .254 | .233 |

The observations and data above show that synthetic rubber-lignin masterbatches prepared by the two-step process of the present invention as compared with masterbatches prepared by a one-step procedure:

(1) Filter and process better in actual preparation,
(2) Show substantial increase in raw and compounded plasticities.
(3) Process better in mill mixing, and
(4) Show equivalent properties as a vulcanizate.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. The method of preparing synthetic rubber in admixture with 25 to 75 parts of lignin per 100 parts of synthetic rubber which comprises mixing an amount of synthetic rubber latex containing 25% to 75% of said 100 parts of synthetic rubber with an aqueous alkali solution containing substantially all said 25 to 75 parts of lignin adding an amount of acid to the mixture to co-precipitate the synthetic rubber and lignin in the mixture and to provide excess acid to coagulate the remaining synthetic rubber when added in latex form to this first co-precipitate, mixing synthetic rubber latex containing the remaining 75% to 25% of said 100 parts of synthetic rubber with the first synthetic rubber-lignin co-precipitate whereby the added latex is coagulated in the presence of said first co-precipitate by said excess acid, and filtering the thus formed mixed coagulum, said synthetic rubber latex being an aqueous emulsion polymerizate of material selected from the group consisting of butadienes-1,3 and mixtures of butadienes-1,3 with compounds containing a single $CH_2=C<$ group which are copolymerizable with butadienes-1,3.

2. The method of claim 1 in which the synthetic rubber is a butadiene-styrene copolymer.

3. The method of preparing synthetic rubber in admixture with 25 to 75 parts of lignin and 5 to 50 parts of processing oil per 100 parts of synthetic rubber which comprises mixing an amount of synthetic rubber latex containing 25% to 75% of said 100 parts of synthetic rubber with an aqueous alkali solution containing substantially all said 25 to 75 parts of lignin, adding an amount of acid to the mixture to co-precipitate the synthetic rubber and lignin in the mixture and to provide excess acid to coagulate the remaining synthetic rubber when added in latex form to this first co-precipitate, mixing synthetic rubber latex containing the remaining 75% to 25% of said 100 parts of synthetic rubber with the first synthetic rubber-lignin co-precipitate whereby the added latex is coagulated in the presence of said first co-precipitate by said excess acid, said processing oil being present in the first co-precipitate from incorporation at some step prior the the mixing of the remaining synthetic rubber latex with the first coprecipitate, and filtering the thus formed mixed coagulum, said synthetic rubber latex being an aqueous emulsion polymerizate of material selected from the group consisting of butadienes-1,3 and mixtures of butadienes-1,3 with compounds containing a single $CH_2=C<$ group which are copolymerizable with butadienes-1,3.

4. The method of claim 3 in which the synthetic rubber is a butadiene-styrene copolymer.

5. The method of preparing synthetic rubber in admixture with 25 to 75 parts of lignin and 5 to 50 parts of processing oil per 100 parts of synthetic rubber which comprises mixing an amount of synthetic rubber latex containing 25% to 75% of said 100 parts of synthetic rubber with an aqueous alkali solution containing substantially all said 25 to 75 parts of lignin, adding an amount of acid to the mixture to co-precipitate the synthetic rubber and lignin in the mixture and to provide excess acid to coagulate the remaining synthetic rubber when added in latex form to this first co-precipitate, mixing said 5 to 50 parts of processing oil with said first co-precipitate, then mixing synthetic rubber latex containing the remaining 75% to 25% of said 100 parts of synthetic rubber with the first synthetic rubber-lignin co-precipitate containing said processing oil whereby the added latex is coagulated in the presence of the first co-precipitate by said excess acid, said synthetic rubber latex being an aqueous emulsion polymerizate of material selected from the group consisting of butadienes-1,3 and mixtures of butadienes-1,3 with compounds containing a single $CH_2=C<$ group which are copolymerizable with butadienes-1,3.

6. The method of claim 5 in which the synthetic rubber is a butadiene-styrene copolymer.

References Cited in the file of this patent

UNITED STATES PATENTS

| | | |
|---|---|---|
| 2,608,537 | Pollak | Aug. 26, 1952 |
| 2,769,789 | Madge et al. | Nov. 6, 1956 |

OTHER REFERENCES

Taft et al.: Ind. and Eng. Chem., volume 45, No. 5, May 1953, pages 1043–1053.